(12) United States Patent
Kimura

(10) Patent No.: US 9,398,444 B2
(45) Date of Patent: Jul. 19, 2016

(54) COMPUTER-READABLE RECORDING MEDIUM, MOBILE DEVICE, AND WIRELESS COMMUNICATION SYSTEM

(71) Applicant: FUJITSU LIMITED, Kawasaki-shi (JP)

(72) Inventor: Masatoshi Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 13/855,351

(22) Filed: Apr. 2, 2013

(65) Prior Publication Data

US 2013/0304790 A1    Nov. 14, 2013

(30) Foreign Application Priority Data

May 8, 2012   (JP) .................. 2012-107043

(51) Int. Cl.
| | |
|---|---|
| G06F 15/16 | (2006.01) |
| H04W 8/24 | (2009.01) |
| H04L 29/08 | (2006.01) |
| H04W 8/00 | (2009.01) |
| H04W 52/02 | (2009.01) |
| H04W 84/12 | (2009.01) |

(52) U.S. Cl.
CPC .............. *H04W 8/24* (2013.01); *H04L 67/1095* (2013.01); *H04W 8/005* (2013.01); *H04W 52/0251* (2013.01); *H04W 84/12* (2013.01)

(58) Field of Classification Search
CPC ....... H04W 8/24; H04W 84/12; H04W 8/005; H04W 52/0251; H04L 67/1095; H04L 27/2655
USPC ......................................... 709/201, 217, 248
See application file for complete search history.

(56) References Cited

U.S. PATENT DOCUMENTS

| | | | |
|---|---|---|---|
| 7,689,721 B2 * | 3/2010 | Mousseau et al. ............. | 709/248 |
| 8,150,937 B2 | 4/2012 | Ng | |
| 8,588,870 B1 * | 11/2013 | Vargantwar ....... | H04M 1/72572 455/127.1 |
| 8,655,307 B1 * | 2/2014 | Walker .............. | H04W 52/0212 455/343.5 |
| 8,683,009 B2 | 3/2014 | Ng | |

(Continued)

FOREIGN PATENT DOCUMENTS

| | | |
|---|---|---|
| JP | 2002-112314 | 4/2002 |
| JP | 2007-129712 | 5/2007 |

(Continued)

OTHER PUBLICATIONS

Korean Office Action mailed Apr. 30, 2014 for corresponding Korean Application No. 10-2013-45845, with English Translation, 10 pages.

(Continued)

*Primary Examiner* — Benjamin M Thieu
(74) *Attorney, Agent, or Firm* — Fujitsu Patent Center

(57) ABSTRACT

A mobile device includes a wireless communication function that performs wireless communication. The mobile device retains therein content to be acquired by an information processing apparatus that is connected to the smart phone by the wireless communication and that is targeted for cooperation. Then, when the retained content has been updated, the mobile device searches for the information processing apparatus targeted for the cooperation by booting up the wireless communication function. Thereafter, the mobile device connects, by the wireless communication, to the information processing apparatus that has been searched for and that is targeted for the cooperation.

8 Claims, 8 Drawing Sheets

(56) References Cited

U.S. PATENT DOCUMENTS

| | | | |
|---|---|---|---|
| 8,683,187 B2* | 3/2014 | Lee | G06F 9/4418 455/558 |
| 9,125,159 B2* | 9/2015 | Lee | H04W 52/0258 |
| 2002/0087546 A1 | 7/2002 | Slater et al. | |
| 2002/0126150 A1 | 9/2002 | Parry | |
| 2004/0242224 A1* | 12/2004 | Janik et al. | 455/426.1 |
| 2005/0233743 A1* | 10/2005 | Karaoguz et al. | 455/432.3 |
| 2006/0168351 A1* | 7/2006 | Ng et al. | 709/248 |
| 2006/0215601 A1* | 9/2006 | Vleugels et al. | 370/328 |
| 2007/0098009 A1* | 5/2007 | Du et al. | 370/445 |
| 2007/0099610 A1 | 5/2007 | Kim et al. | |
| 2007/0184836 A1* | 8/2007 | He | H04W 52/0212 455/434 |
| 2008/0228852 A1 | 9/2008 | Husa et al. | |
| 2008/0242313 A1* | 10/2008 | Lee | H04W 52/0235 455/456.1 |
| 2009/0030968 A1* | 1/2009 | Boudreau et al. | 709/201 |
| 2009/0234927 A1* | 9/2009 | Buzescu | H04W 8/22 709/206 |
| 2009/0327449 A1 | 12/2009 | Silverman et al. | |
| 2011/0313972 A1* | 12/2011 | Albouze | 707/624 |
| 2012/0030325 A1 | 2/2012 | Silverman et al. | |
| 2012/0084397 A1 | 4/2012 | Shinohara | |
| 2013/0132338 A1* | 5/2013 | Numakami | 707/610 |
| 2014/0181276 A1 | 6/2014 | Silverman et al. | |

FOREIGN PATENT DOCUMENTS

| | | |
|---|---|---|
| JP | 2008-518354 A | 5/2008 |
| JP | 2008-147787 | 6/2008 |
| JP | 2009-246898 | 10/2009 |
| JP | 2010-57165 | 3/2010 |
| KR | 10-2011-0038638 | 4/2011 |

OTHER PUBLICATIONS

KROA—Office Action mailed on Jan. 28, 2015 for Korean Patent Application No. 10-2013-45845, with English translation.

CNOA—First Notification of Office Action mailed on Jul. 22, 2015 for Chinese Patent Application No. 201310149384.9, with English translation.

KROA—Korean Office Action (Notice of Final Rejection) mailed on Jul. 29, 2015 for Korean Patent Application No. 10-2013-0045845, with English translation.

KROA—Korean Office Action issued for Korean Patent Application No. 10-2013-0045845, mailed on Dec. 2, 2015.

JPOA—Japanese Office Action issued for Japanese Patent Application No. 2012-107043, mailed on Nov. 10, 2015, with partial English translation.

CNOA—Second Notification of Office Action issued on Mar. 25, 2016 for Chinese Patent Application No. 201310149384.9, with English translation.

DEOA—Office Action mailed on Apr. 12, 2016 for German Patent Application No. 10 2013 207 422.0, with English translation.

* cited by examiner

FIG.3

| STORAGE LOCATION | FILE NAME | TYPE | UPDATE DATE AND TIME |
|---|---|---|---|
| FOLDER A | AAA | STILL IMAGE | 2012/4/25 12:00 |
| FOLDER B | BBB | MOVING IMAGE | 2012/4/27 13:15 |
| ... | ... | ... | ... |

FIG.4

| STILL IMAGE TRANSMISSION | MOVING IMAGE TRANSMISSION |
|---|---|
| VALID | VALID |
| VALID | INVALID |
| INVALID | VALID |
| INVALID | INVALID |

FIG.5

| NODE NAME | | | VALUE |
|---|---|---|---|
| Command | | | |
| | Function | | COMMAND CHARACTER STRING |
| | CommandInfo | | COMMAND ADDITIONAL INFORMATION NODE |
| | | ScheduleImport | |
| | | STILL IMAGE | YES OR NO |
| | | MOVING IMAGE | YES OR NO |

FIG.6

```
<Command>
    <Function>CONNECTION</Function>
    <CommandInfo>
        <ScheduleImport>
            <Still Image>YES</Still Image>
            <Moving Image>YES</Moving Image>
        </ScheduleImport>
    </CommandInfo>
</Command>
```

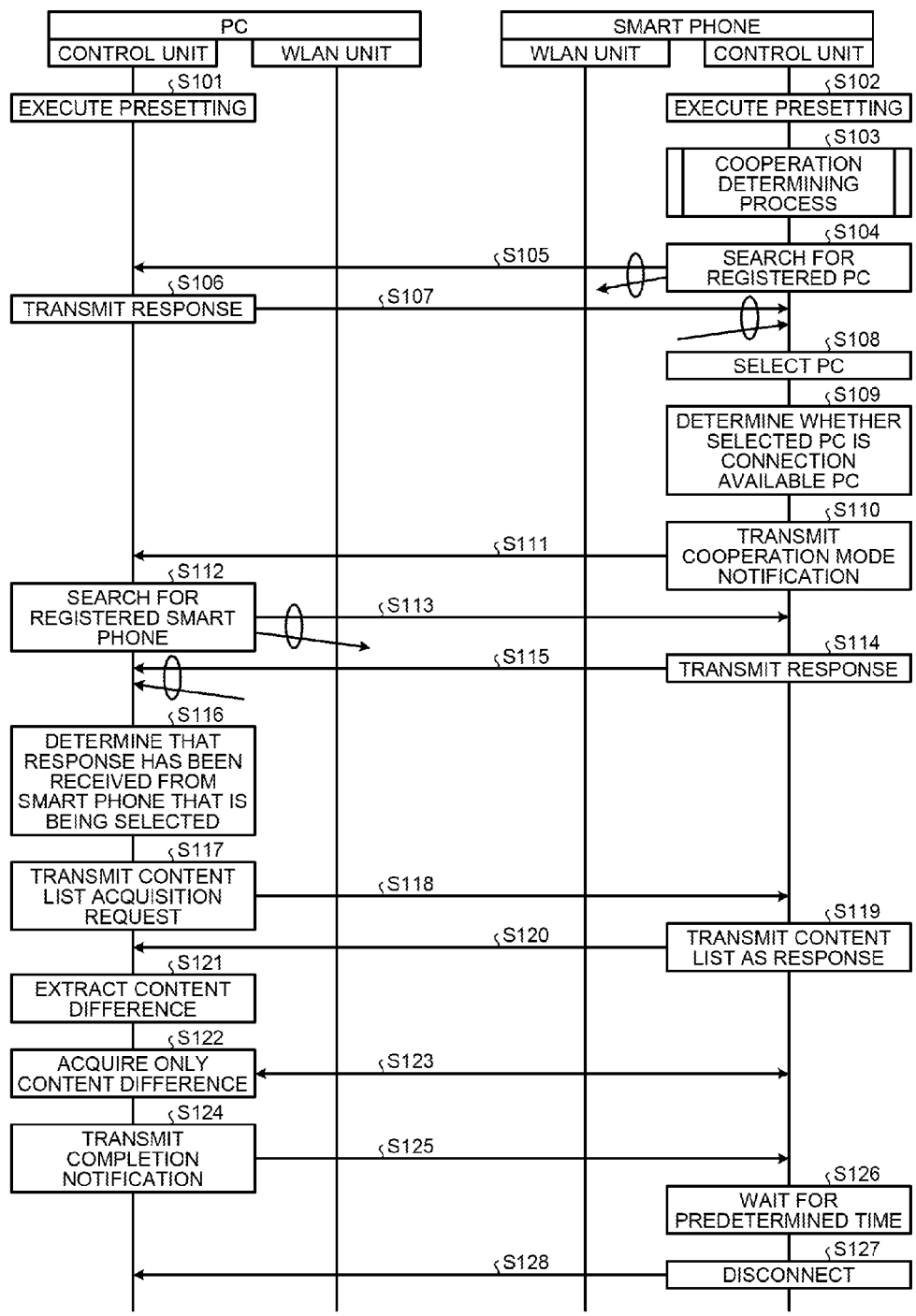

COMPUTER-READABLE RECORDING MEDIUM, MOBILE DEVICE, AND WIRELESS COMMUNICATION SYSTEM

CROSS-REFERENCE TO RELATED APPLICATION

This application is based upon and claims the benefit of priority of the prior Japanese Patent Application No. 2012-107043, filed on May 8, 2012, the entire contents of which are incorporated herein by reference.

FIELD

The embodiments discussed herein are related to a wireless communication program, a mobile device, and a wireless communication system.

BACKGROUND

It has become the case in recent years for personal computers (PCs) or the like to acquire, by using wireless communication such as wireless fidelity (Wi-Fi), content that is retained in mobile terminals, such as smart phones or Wi-Fi equipped digital cameras. Examples of the content acquired in such cases include moving image data captured by digital cameras and application data downloaded by smart phones or the like.

In the following, an example method of acquiring content will be described. As a presetting, a user installs a cooperation application or the like into both a smart phone and a personal computer used by the user and then sets both of them to the same service set identifier (SSID). Specifically, the user sets information with which it is possible to recognize that both the smart phone and the personal computer are registered terminals.

After the presetting is finished in this way, by operating a Wi-Fi function, the smart phone periodically searches for a registered PC that is present in the vicinity of the smart phone. If the smart phone detects a registered PC, the smart phone establishes a Wi-Fi connection with the detected PC. Then, the PC that has established the Wi-Fi connection with the smart phone acquires content from the smart phone and automatically stores therein the acquired content. Thereafter, the smart phone disconnects the Wi-Fi connection with the PC. As described above, a PC can acquire content from a smart phone and the content can also be synchronized between the PC and the smart phone.

Patent Document 1: Japanese Laid-open Patent Publication No. 2010-57165

However, with the conventional technology, because mobile terminals, such as smart phones or Wi-Fi equipped video cameras, periodically and repeatedly connect and disconnect to the Wi-Fi connection, there is a problem in that electrical power consumption is large.

In general, mobile terminals are often carried and used by users and thus it is desirable to reduce the electrical power consumption; therefore, from the viewpoint of electrical power consumption, it is not preferable to periodically use a Wi-Fi function that consumes a large amount of electrical power.

SUMMARY

According to an aspect of an embodiment, a computer-readable recording medium having stored therein a wireless communication program causing a mobile device to execute a process: the process includes retaining content that is to be acquired by an information processing apparatus, the information processing apparatus being connected to the mobile device by a wireless communication and being targeted for cooperation; searching for, when the retained content has been updated, the information processing apparatus targeted for the cooperation, by booting up a wireless communication function to perform the wireless communication; and connecting to, by the wireless communication, the information processing apparatus that has been searched for and that is targeted for the cooperation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table illustrating an example of a list of content stored in a content DB;

FIG. 4 is a table illustrating an example of information stored in the content setting DB;

FIG. 5 is a schematic diagram illustrating an example of notification data in a cooperation mode;

FIG. 6 is a schematic diagram illustrating an example of a cooperation mode notification;

FIG. 7 is a processing sequence illustrating the flow of a process of acquiring content;

DESCRIPTION OF EMBODIMENTS

Preferred embodiments will be explained with reference to accompanying drawings. The present invention is not limited to these embodiments.

[a] First Embodiment

Overall Configuration

Figure 1:
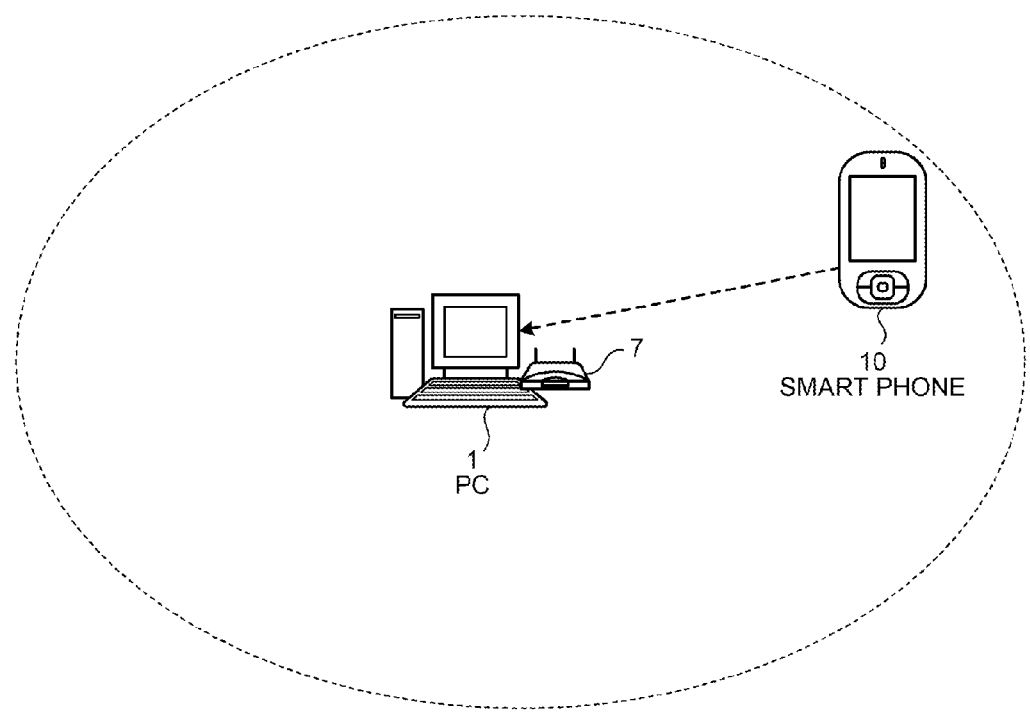
FIG. 1 is a schematic diagram illustrating an example of the overall configuration of a wireless communication system.

FIG. 1 is a schematic diagram illustrating an example of the overall configuration of a wireless communication system. As illustrated in FIG. 1, this wireless communication system includes a personal computer (hereinafter, referred to as a PC) 1 and a smart phone 10. For example, the wireless communication system is an home wireless local area network (LAN) constituted by a user using, for example, wireless fidelity (Wi-Fi). The number of units illustrated in the drawing is only an example and is not limited thereto.

In the wireless communication system, the PC 1 and the smart phone 10 cooperate with each other and acquire content. For example, the PC 1 is a terminal that executes a function as an access point 7, whereas the smart phone 10 is a terminal that makes a wireless communication connection via the access point 7. In this example, the PC 1 includes the access point 7; however, the configuration is not limited thereto. For example, instead of the PC 1 and the smart phone 10, a device, such as a router, may also have an access point.

The PC 1 is an information processing apparatus that periodically connects to the smart phone 10 via wireless communication, acquires content from the smart phone 10, and stores the content in the PC. The smart phone 10 is a mobile device that retains content that is to be acquired by the PC 1 that is connected via wireless communication.

In this state, if content, which is retained in the smart phone 10 and is to be acquired by the PC 1 that is targeted for cooperation, is updated, the smart phone 10 starts a wireless communication function, such as Wi-Fi, and searches for the PC 1, which is targeted for the cooperation. Then, the smart phone 10 connects to the searched for PC 1, which is targeted for the cooperation, via wireless communication.

As described above, if content, which is to be acquired by a cooperation target device, is updated, the smart phone 10 boots up Wi-Fi or the like and connects to the PC 1. Consequently, when compared with a case in which Wi-Fi is periodically booted up, it is possible to eliminate undesired Wi-Fi boot ups, thus reducing the electrical power consumed by the smart phone 10.

Configuration of a Device

Figure 2:
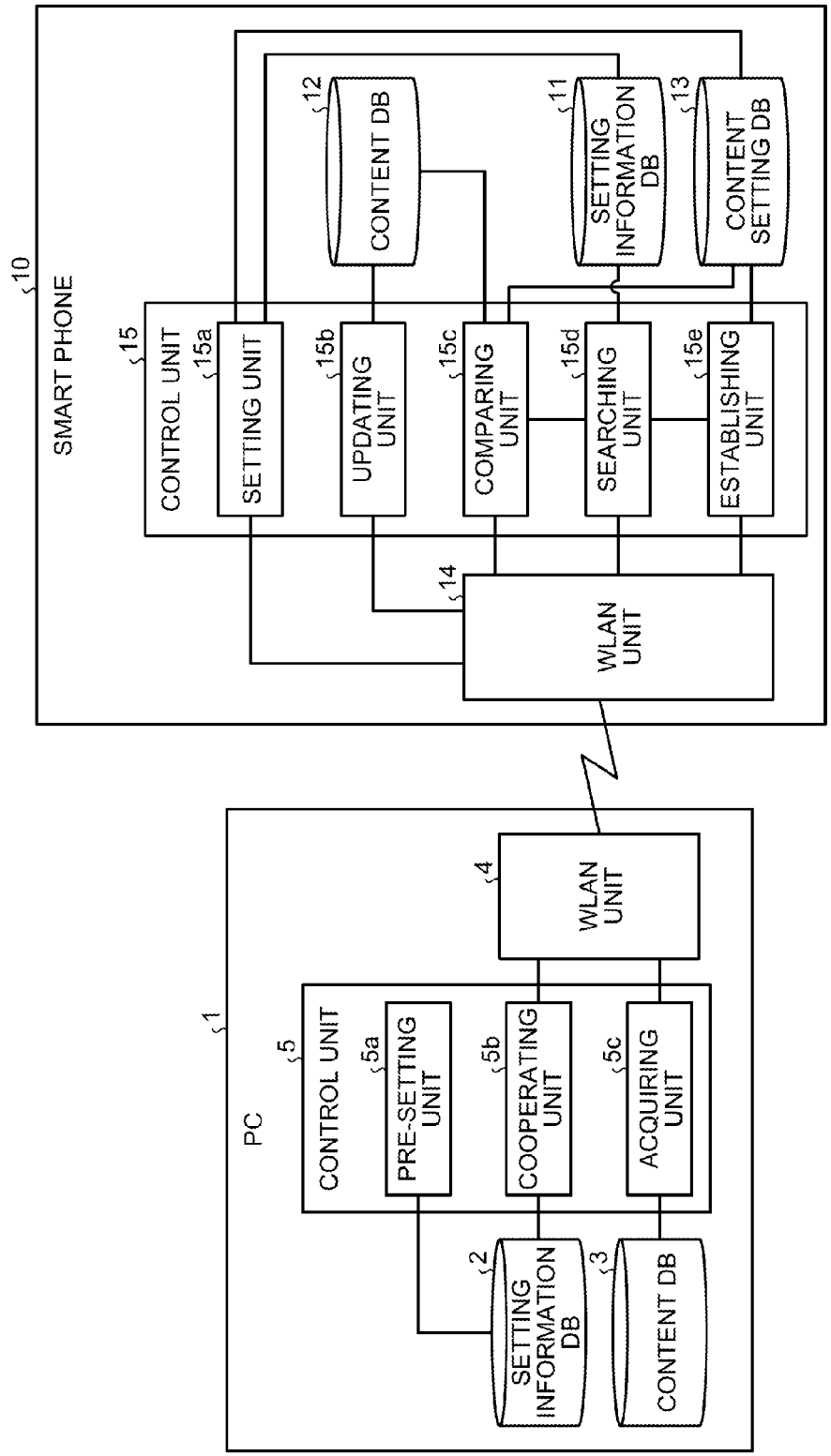
FIG. 2 is a functional block diagram illustrating the configuration of each unit constituting the wireless communication system.

In the following, the functional configuration of the PC 1 and the smart phone 10 illustrated in FIG. 1 will be described. FIG. 2 is a functional block diagram illustrating the configuration of each unit constituting the wireless communication system. Here, as an example of wireless communication, a description will be given of a case where Wi-Fi is used; however, the embodiment is not limited thereto. Another wireless communication may also be used.

Configuration of the PC

As illustrated in FIG. 2, the PC 1 includes a setting information database (DB) 2, a content DB 3, a wireless LAN (WLAN) unit 4, and a control unit 5. The setting information DB 2 and the content DB 3 are arranged in a storage device, such as a memory. The control unit 5 is an electronic circuit, such as a central processing unit (CPU).

The processing units illustrated in FIG. 2 are only examples and are not limited thereto. For example, it may also be possible to use the processing units included in a typical PC, for example, a displaying unit, such as a display; an input unit, such as a mouse; an interface that connects to a wired network; and the like.

The setting information DB 2 is a storing unit that stores therein setting information that is used to cooperate with the smart phone 10, which is targeted for corporation, via Wi-Fi. For example, the setting information DB 2 stores therein, for example, a service set identifier (SSID) that is the same as that of the smart phone 10, an encryption key, and a media access control (MAC) address of the cooperation target device. The information stored here is updated by a pre-setting unit 5a.

The content DB 3 is a storing unit that stores therein content acquired from the smart phone 10. For example, the content DB 3 stores content, such as a still image, moving image data, and application data by associating them with the date and time at which the content is acquired or created. The information stored here is updated by an acquiring unit 5c.

The WLAN unit 4 is a processing unit that executes wireless communication using Wi-Fi. In this case, the WLAN unit 4 identifies, by using the setting information stored in the setting information DB 2, the smart phone 10 that is targeted for corporation and then connects to the smart phone 10 via Wi-Fi.

The control unit 5 is a processing unit that includes the pre-setting unit 5a, a cooperating unit 5b, and the acquiring unit 5c; that connects to the smart phone 10 via wireless connection by using these units; and that acquires the content. Furthermore, the pre-setting unit 5a, the cooperating unit 5b, and the acquiring unit 5c are processing units executed by the CPU.

The pre-setting unit 5a is a processing unit that sets information that is used to cooperate with the smart phone 10 via Wi-Fi. For example, the pre-setting unit 5a receives, from an administrator or the like, an SSID that is the same as that of the smart phone 10, an encryption key, and a MAC address of a cooperation target device, and then stores them in the setting information DB 2. Furthermore, if the pre-setting unit 5a receives a change in SSID or encryption key from the administrator or the like, the pre-setting unit 5a updates the information stored in the setting information DB 2. Furthermore, if the pre-setting unit 5a receives a setting command from an administrator or the like, the pre-setting unit 5a can also execute the command and store setting information in the setting information DB 2.

The cooperating unit 5b is a processing unit that establishes wireless communication with the smart phone 10 via Wi-Fi. Specifically, the cooperating unit 5b specifies, from connection requests received from Wi-Fi that is detected by the WLAN unit 4, a connection request containing an SSID and an encryption key that match those stored in the setting information DB 2. Then, the cooperating unit 5b transmits a connection permission response with respect to the specified connection request, thus establishing wireless communication. As described above, the cooperating unit 5b identifies the smart phone 10 that can cooperate with the PC 1 and allows the identified smart phone 10 to cooperate with the PC 1.

The acquiring unit 5c is a processing unit that acquires content from the smart phone 10 that is connected via Wi-Fi and stores the content in the content DB 3. Specifically, if a Wi-Fi connection to the smart phone 10 is established by both the cooperating unit 5b and the WLAN unit 4, the acquiring unit 5c receives, from the smart phone 10, a cooperation mode notification indicating the acquisition target. Then, the acquiring unit 5c acquires the content from the smart phone 10 in accordance with the received cooperation mode notification and stores it in the content DB 3. At this point, the acquiring unit 5c may also compare the content stored in the content DB 3 with the received content that is to be newly acquired and may also acquire only the content that is different from the content already stored in the content DB 3.

Configuration of the Smart Phone

As illustrated in FIG. 2, the smart phone 10 includes a setting information DB 11, a content DB 12, a content setting DB 13, a WLAN unit 14, and a control unit 15. The setting information DB 11, the content DB 12, and the content setting DB 13 are arranged in a storage device, such as a memory. The control unit 5 is an electronic circuit, such as a CPU.

The processing units illustrated in FIG. 2 are only examples and are not limited thereto. For example, it may also be possible to use processing units included in a typical smart phone, for example, a display input unit, such as a touch panel; a call processing unit that executes a voice call; a connecting unit that connects to the Internet; a processing unit that download an application or the like; a still image capturing unit, such as a camera; a battery; and the like.

The setting information DB 11 is a storing unit that stores therein setting information that is used to cooperate with the PC 1, which is targeted for cooperation, via Wi-Fi. For example, the setting information DB 11 stores therein an SSID that is the same as that of the PC 1, an encryption key, a MAC address of a cooperate target device, and the like. The information stored here is updated by a setting unit 15a.

The content DB 12 is a storing unit that stores therein content to be acquired by the PC 1, which is targeted for cooperation and connected via Wi-Fi. For example, the content DB 12 stores therein content, such as a still image, moving image data, application data, and the like. The information stored here is updated by an updating unit 15b.

Furthermore, the content DB 12 also stores therein a content list indicating the list of retained content. The content list is created by, for example, a comparing unit 15c. FIG. 3 is a table illustrating an example of a list of content stored in a content DB. As illustrated in FIG. 3, the content list manages, in an associated manner, the following items: the "storage location", the "file name", the "type", and the "update date and time". The "storage location" mentioned here represents a folder name in which content is stored; the "file name" represents the file name of content; the "type" represents the type of content and, for example, a still image, a moving image, an application, and the like is set in this item; and the "update date and time" represents the date and time when content was registered or updated.

In the example illustrated in FIG. 3, the latest update date and time of still image data with the file name "AAA" stored in a folder A is "2012/4/25 12:00". Similarly, the latest update date and time of moving image data with the file name "BBB" stored in a folder B is "2012/4/27 13:15".

The content setting DB 13 is a storing unit that stores therein setting information that indicates the status of content that is to be acquired by the PC 1 from pieces of the content stored in the content DB 12. FIG. 4 is a table illustrating an example of information stored in the content setting DB. As illustrated in FIG. 4, the content setting DB 13 stores therein, in an associated manner, "still image transmission" and "moving image transmission". In the content setting DB 13, one of the combinations illustrated in FIG. 4 is set by the setting unit 15a.

The "still image transmission" stored here indicates whether content having the type "still image" is targeted for acquisition and the "moving image transmission" indicates whether content having the type "moving image" is targeted for acquisition. In the example illustrated in FIG. 4, the combination of "still image transmission=valid" and "moving image transmission=valid" indicates that the PC 1 acquires both still image data and moving image data at the time of cooperation. Furthermore, the combination of "still image transmission=valid" and "moving image transmission=invalid" indicates that the PC 1 acquires only still image data at the time of cooperation. Furthermore, the combination of "still image transmission=invalid" and "moving image transmission=valid" indicates that the PC 1 acquires only moving image data at the time of cooperation. Furthermore, the combination of "still image transmission=invalid" and "moving image transmission=invalid" indicates that automatic cooperation is invalid.

The control unit 15 is a processing unit that includes the setting unit 15a, the updating unit 15b, the comparing unit 15c, a searching unit 15d, and an establishing unit 15e, all of which update content or cooperate with the PC 1. The setting unit 15a, the updating unit 15b, the comparing unit 15c, the searching unit 15d, and the establishing unit 15e are processing units executed by, for example, a CPU.

The setting unit 15a is a processing unit that sets information that is used to cooperate with the PC 1 via Wi-Fi or information that indicates an acquisition target. For example, the setting unit 15a receives, from an administrator or the like, an SSID that is the same as that of the PC 1, an encryption key, and a MAC address of an acquisition target device and then stores them in the setting information DB 11. Furthermore, if the setting unit 15a receives a change in SSID or encryption key from an administrator or the like, the setting unit 15a updates the information stored in the setting information DB 11. Furthermore, the setting unit 15a receives, from an administrator or the like, setting information that is to be acquired by the PC 1 and then stores the setting information in the content setting DB 13. Furthermore, if the setting unit 15a receives a setting command from an administrator or the like, the setting unit 15a can also execute the command and store the setting information in the setting information DB 11 or the content setting DB 13.

The updating unit 15b is a processing unit that acquires content or updates the content. For example, the updating unit 15b stores, in the content DB 12, moving image data captured by a camera (not illustrated). Furthermore, if an application or the like is downloaded or installed, the updating unit 15b specifies the location to where the application is downloaded or installed and stores the location in the content DB 12. Furthermore, the updating unit 15b updates, automatically or manually by an administrator or the like, content stored in the content DB 12.

The comparing unit 15c is a processing unit that determines whether content that has been acquired by the PC 1 is updated. Specifically, the comparing unit 15c is a processing unit that determines, at predetermined intervals, whether an update is performed. The comparing unit 15c compares the content that is previously acquired by the PC 1 with the content that is currently stored and then determines whether a difference is present. If the comparing unit 15c determines that a difference is present, the comparing unit 15c instructs the searching unit 15d to start a search process.

For example, the comparing unit 15c allows the content DB 12 to store therein the content list that was compared at the time of previous comparison. Then, if it is time to compare, the comparing unit 15c creates, from the content stored in the content DB 12, a list of content that is currently stored. Then, the comparing unit 15c compares the previous content list that is stored in the content DB 12 or the like with the content list that is currently created and determines whether a difference is present.

An example case in which the comparing unit 15c determines that a content difference is present includes a case in which new content is stored in the content DB 12 or case in which application content or the like is updated. The time at which content lists are compared may arbitrarily be set. For example, when the smart phone 10 is being charged, polling may be performed at an interval of 15 minutes, whereas, when the smart phone 10 is not being charged, polling may be performed at an interval of 60 minutes.

The searching unit 15d is a processing unit that boots up Wi-Fi when the stored content is updated and that searches for the PC 1 that is targeted for cooperation. Specifically, if the searching unit 15d receives an instruction to start a search process from the comparing unit 15c, the searching unit 15d instructs the WLAN unit 14 to boot up Wi-Fi, thus booting up the Wi-Fi. Then, the searching unit 15d searches PCs, which are present in an area in which the smart phone 10 can communicate via wireless communication, for the PC 1 that is targeted for cooperation.

For example, from among Wi-Fi communication received by the WLAN unit 14 in which Wi-Fi is booted up, the searching unit 15d searches for communication that transmits a connection request using the same SSID as that stored in the setting information DB 11. Then, if the searching unit 15d has searched for Wi-Fi communication having the same SSID as that stored in the setting information DB 11, the searching unit 15d instructs the establishing unit 15e to establish the communication.

The establishing unit 15e is a processing unit that connects to the PC 1, which is targeted for cooperation, via Wi-Fi. Specifically, by responding to the Wi-Fi communication that was searched for by the searching unit 15d, the establishing unit 15e connects to the PC 1, which is targeted for cooperation, via the Wi-Fi. For example, the establishing unit 15e sends an SSID or an encryption key, as a response, to the Wi-Fi that was searched for by the searching unit 15d. If the establishing unit 15e receives, from the response destination, a response indicating that, for example, connection has been completed, the communication with the response destination is established via Wi-Fi. As described above, the establishing unit 15e can establish a Wi-Fi connection with the PC 1 targeted for cooperation and thus can cooperate with the PC 1.

Furthermore, when the establishing unit 15e establishes a Wi-Fi connection, the establishing unit 15e notifies the PC 1, which is targeted for cooperation, of content to be acquired. Specifically, the establishing unit 15e transmits, to the PC 1, a cooperation mode notification that is created from the setting information stored in the content setting DB 13. In the following, a description will be given of the content or the format of notification sent by the establishing unit 15e. FIG. 5 is a schematic diagram illustrating an example of notification data in a cooperation mode. FIG. 6 is a schematic diagram illustrating an example of a cooperation mode notification.

For example, as illustrated in FIG. 5, the establishing unit 15e creates a Command, as a cooperation mode notification, containing "Function, CommandInfo, ScheduleImport (Still Image, Moving Image)". In the "Function", a character string of a command notified to the destination is set. If the Command does not contain the subject node (flag), information with which it is determined that cooperation is manually performed is set in the "CommandInfo".

The "ScheduleImport (Still Image)" is a flag specifying whether a still image is automatically acquired at the time of cooperation. If a still image is automatically acquired, "YES" is set, whereas, if a still image is not automatically acquired, "NO" is set. The "ScheduleImport (Moving Image)" is a flag specifying whether a moving image is automatically acquired at the time of cooperation. If a moving image is automatically acquired, "YES" is set, whereas, if a moving image is not automatically acquired, "NO" is set.

Then, the establishing unit 15e transmits, to the PC 1, the cooperation mode notification indicated by the information illustrated in FIG. 5 in the extensible markup language (XML) format as illustrated in FIG. 6. Specifically, in the "Function", the establishing unit 15e sets the "CONNECTION" that is previously specified. Furthermore, in the "ScheduleImport (Still Image)", the establishing unit 15e sets the content of settings of "still image transmission" stored in the content setting DB 13. Similarly, in the "ScheduleImport (Moving Image)", the establishing unit 15e sets the content of settings of the "moving image transmission" stored in the content setting DB 13. The establishing unit 15e transmits the cooperation mode notification in the XML format created in this way to the PC 1.

Flow of a Process

In the following, the flow of a process performed by the wireless communication system will be described with reference to FIGS. 7 and 8. A processing sequence will be described first with reference to FIG. 7 and then the process performed by the smart phone 10 will be described with reference to FIG. 8.

Processing Sequence

FIG. 7 is a processing sequence illustrating the flow of a process of acquiring content. As illustrated in FIG. 7, the pre-setting unit 5a in the control unit 5 in the PC 1 executes a presetting, such as an SSID and an encryption key (Step S101). Similarly, the setting unit 15a in the control unit 15 in the smart phone 10 executes a presetting, such as an SSID and an encryption key (Step S102). At this time, the setting unit 15a in the smart phone 10 sets, in the content setting DB 13, acquisition of content.

Then, the control unit 15 in the smart phone 10 executes a cooperation determining process, which will be described later with reference to FIG. 8 (Step S103). In this example, it is assumed that it is determined that Wi-Fi is connected. Then, the searching unit 15d in the control unit 15 in the smart phone 10 searches for a registered PC (Steps S104 and S105). Specifically, the searching unit 15d searches for a PC targeted for cooperation in which the same SSID or the like is set.

The cooperating unit 5b in the control unit 5 in the PC 1 transmits a response to the search request received from the smart phone 10 (Steps S106 and S107). Then, the searching unit 15d in the control unit 15 in the smart phone 10 selects the registered PC 1 that has responded via Wi-Fi from among the PCs that are present in a communication-available area and that transmit a response (Step S108).

Then, the establishing unit 15e in the control unit 15 in the smart phone 10 determines whether the selected PC 1 is a connection available PC (Step S109). For example, if the comparison between the MAC address of the PC 1 contained in the response and the MAC address that is previously acquired by a presetting or the like indicates that the addresses match, the establishing unit 15e determines that connection is available.

If the result of the determination is that the connection is available with the PC 1 that is being selected, the establishing unit 15e creates a cooperation mode notification described with reference to FIG. 6, and transmits the notification to the selected PC 1 (Steps S110 and S111). In contrast, if the connection is not available with the PC 1 that is being selected, the establishing unit 15e does not transmit the cooperation mode notification.

Then, the cooperating unit 5b in the control unit 5 in the PC 1 searches for the smart phone 10 in order to connect to the smart phone 10 that is being selected (Steps S112 and S113). The establishing unit 15e in the smart phone 10 determines whether the information contained in the searching executed by the PC 1 matches the information, such as the SSID, that has already been acquired at the presetting. If the information matches, the establishing unit 15e responds to the searching (Steps S114 and S115). Then, the cooperating unit 5b in the control unit 5 in the PC 1 determines that a response has been received from the smart phone 10 that is being selected (Step S116).

When a Wi-Fi connection between the PC 1 and the smart phone 10, both of which have already been registered, has been established in this way, the acquiring unit 5c in the PC 1 requests transmission of a content list from the smart phone 10 targeted for cooperation (Steps S117 and S118). The comparing unit 15c in the smart phone 10 that receives the request transmits, to the PC 1, the content list created during the cooperation determining process (Steps S119 and S120).

Then, the acquiring unit 5c in the PC 1 compares the content list of the content stored in the content DB 3 with the content list acquired from the smart phone 10 and extracts the content difference (Step S121). Then, the acquiring unit 5c in the PC 1 reads, from the content DB 12 in the smart phone 10, the content corresponding to the extracted content difference and stores the difference in the content DB 3 in the PC 1 (Steps S122 and S123). At this time, the acquiring unit 5c in the PC 1 acquires content in accordance with the flag notified by using the cooperation mode notification. For example, if data corresponding to the content difference is a still image and if the notified flag represents "OFF", the acquiring unit 5c does not acquire content.

If the acquiring unit 5c in the PC 1 completes the acquisition of the content difference, the acquiring unit 5c transmits, to the smart phone 10, a completion notification indicating that the acquisition of the content has been completed (Steps S124 and S125). If the establishing unit 15e in the smart phone 10 receives the completion notification, the establishing unit 15e waits for a predetermined time and maintains a Wi-Fi connection (Step S126).

If the content is updated during this predetermined time and if the type of the updated content is the type that is to be acquired, the establishing unit 15e in the smart phone 10 notifies the PC 1 of that content. Then, the PC 1 acquires the content of which it was notified. If the content has been updated, a timer is reset once and then the timer is set again after the update. Then, the establishing unit 15e in the smart phone 10 disconnects Wi-Fi after the predetermined time has elapsed (Steps S127 and S128).

Cooperation Determining Process

Figure 8:
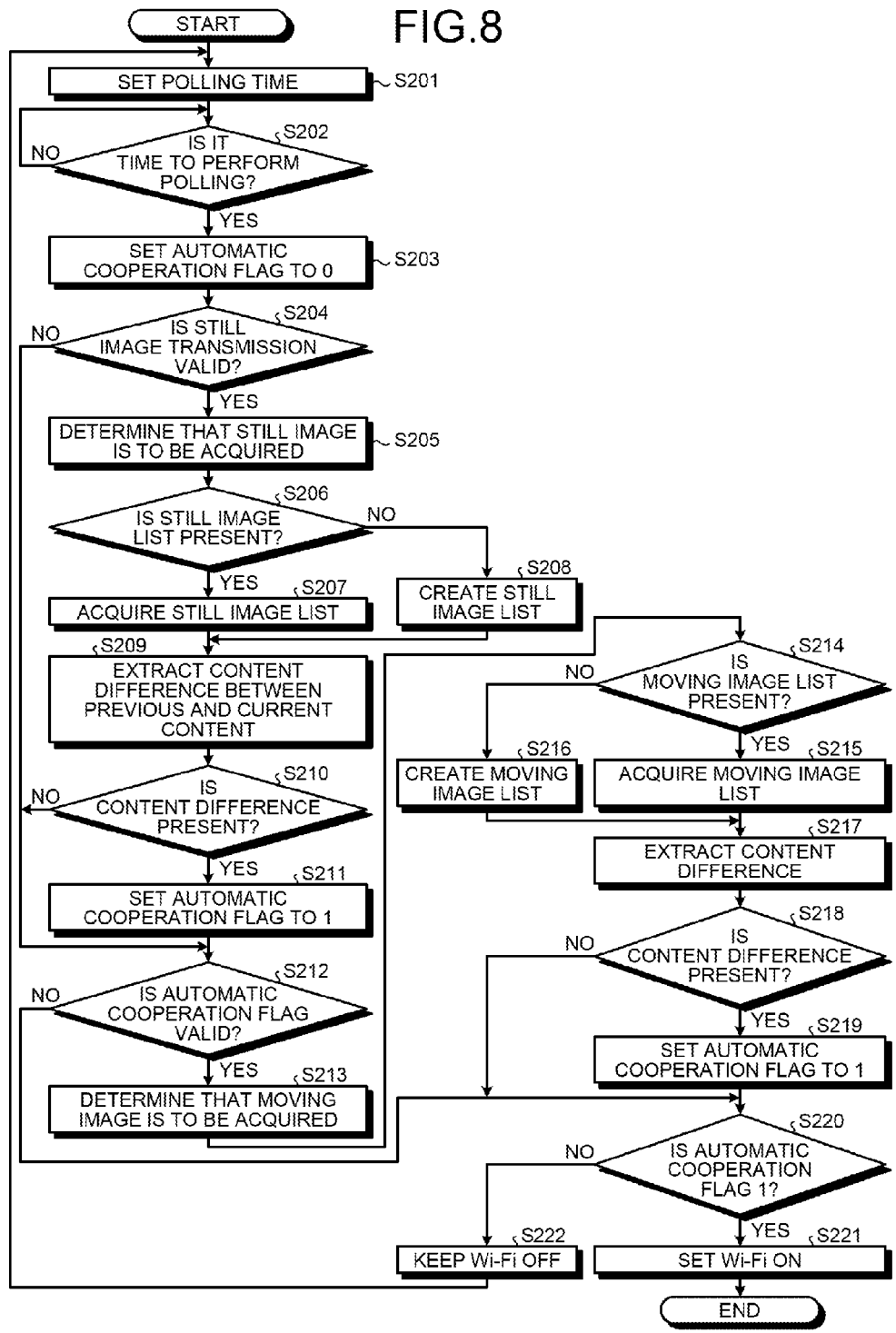
FIG. 8 is a flowchart illustrating the flow of a cooperation determining process.

FIG. 8 is a flowchart illustrating the flow of a cooperation determining process. This process is executed by the smart phone 10 at Step S103, as illustrated in FIG. 7.

As illustrated in FIG. 8, the comparing unit 15c in the smart phone 10 sets a polling time (Step S201). Specifically, the comparing unit 15c sets an interval for starting of the cooperation determining process. Then, if it is time to perform the polling (Yes at Step S202), the comparing unit 15c sets an automatic cooperation flag to 0 (Step S203).

Then, the comparing unit 15c refers to the content setting DB 13 and determines whether "valid" is set in the still image transmission (Step S204). If the comparing unit 15c determines that "valid" is set in the still image transmission (Yes at Step S204), the comparing unit 15c determines that a still image is to be acquired (Step S205) and determines whether a still image list is present (Step S206). Furthermore, if the comparing unit 15c determines that "invalid" is set in the still image transmission (No at Step S204), the comparing unit 15c executes the process at Step S212 and the subsequent processes.

Then, if the comparing unit 15c determines that a still image list is present (Yes at Step S206), the comparing unit 15c acquires the still image list from the content DB 12 (Step S207). In contrast, if the comparing unit 15c determines that a still image list is not present (No at Step S206), the comparing unit 15c creates a still image list by using the information stored in the content DB 12 (Step S208).

Then, the comparing unit 15c compares the previous still image list with the current still image list and extracts a content difference (Step S209). If the content difference is present (Yes at Step S210), the comparing unit 15c sets the automatic cooperation flag to 1 (Step S211). In contrast, after comparing the previous still image list with the current still image list, if the comparing unit 15c determines that a content difference is not present (No at Step S210), the comparing unit 15c executes the process at Step S212 without the processing at Step S211.

Subsequently, the comparing unit 15c refers to the content setting DB 13 and determines whether "valid" is set in the moving image transmission (Step S212). If the comparing unit 15c determines that "valid" is set in the moving image transmission (Yes at Step S212), the comparing unit 15c determines that a moving image is to be acquired (Step S213) and determines whether a moving image list is present (Step S214). Furthermore, if the moving image transmission determines that "invalid" is set (No at Step S212), the comparing unit 15c executes the process at Step S220 and the subsequent processes.

Then, if the comparing unit 15c determines that a moving image list is present (Yes at Step S214), the comparing unit 15c acquires the moving image list from the content DB 12 (Step S215). In contrast, if the comparing unit 15c determines that the moving image list is not present (No at Step S214), the comparing unit 15c creates a list of the moving image by using the information stored in the content DB 12 (Step S216).

Then, the comparing unit 15c compares the previous moving image list with the current moving image list and extracts a content difference (Step S217). If the content difference is present (Yes at Step S218), the comparing unit 15c sets the automatic cooperation flag to 1 (Step S219). In contrast, after comparing the previous moving image list with the current moving image list, if the comparing unit 15c determines that a content difference is not present (No at Step S218), the comparing unit 15c executes the process at Step S220 without executing the process at Step S219.

After comparing the difference between the content to be acquired, the comparing unit 15c determines whether the automatic cooperation flag is 1 (Step S220). If the comparing unit 15c determines that the automatic cooperation flag is set to 1 (Yes at Step S220), the comparing unit 15c boots up Wi-Fi (Step S221). Then, the process at Step S104 and the subsequent processes illustrated in FIG. 7 are executed. In contrast, if the comparing unit 15c determines that the automatic cooperation flag is set to 0 (No at Step S220), the comparing unit 15c leaves the Wi-Fi off (Step S222), returns to the process at Step S201, and repeats the subsequent processes.

Advantage

As described above, the smart phone 10 retains the content to be acquired by the PC 1 that is connected via Wi-Fi. If the retained content has been updated, by booting up Wi-Fi to connect to the PC 1, it is possible to reduce undesired connecting and thus waste less battery power. Furthermore, if the retained content has been updated, the smart phone 10 can allow the PC 1 to acquire content and thus synchronize content without delay.

[b] Second Embodiment

In the above explanation, a description has been given of the embodiment according to the present invention; however, the embodiment is not limited thereto and can be implemented with various kinds of embodiments other than the embodiment described above. Therefore, another embodiment will be described below.

Polling Timing

For example, the time at which the smart phone 10 executes the cooperation determining process may also be arbitrarily set and changed. Furthermore, if the remaining battery level is lower than a predetermined value, the smart phone 10 can also stop the cooperation determining process until the next time at which the smart phone 10 executes the cooperation determining process even if it is time to execute polling. For example, the predetermined value can be arbitrarily set to, for example, 20% or the like.

Furthermore, it is also possible to execute the cooperation determining process after one minute has elapsed since the setting has been changed, only immediately after the setting of the still image transmission or the moving image transmission has been changed from invalid to valid for the first time. Furthermore, the smart phone 10 executes the cooperation determining process at the time of a locked state in which a user does not operate the smart phone 10. Furthermore, the smart phone 10 executes the cooperation determining process at polling intervals; however, the cooperation determining process may also be executed when an actual Wi-Fi connection is locked. By doing so, content can also be synchronized without disturbing the operation performed by the user. Furthermore, when automatic cooperation is started, a notification indicating that content is being acquired is sent by using a status bar, a balloon, a screen, and the like of the devices that cooperate with each other.

Furthermore, in the first embodiment, a description has been given of a case in which the PC 1 extracts a content difference and acquires the extracted difference; however, the embodiment is not limited thereto. For example, the smart phone 10 may also notify the PC 1 of a list of the differences of the content. By doing so, it is possible to reduce a processing load applied on the PC 1 side.

Multiple Number of Device Targeted for Cooperation

In the first embodiment, a description has been given of a case in which a single device targeted for cooperation is used; however, the embodiment is not limited thereto. For example, multiple devices may also be previously set as devices targeted for cooperation. In such a case, for example, the smart phone 10 synchronously performs a probe. Then, from among the detected PCs subjected to the probe, the smart phone 10 performs filtering on PCs that are not targeted for cooperation. Furthermore, if the smart phone 10 detects multiple PCs targeted for cooperation, the smart phone 10 acquires content by allowing the PCs to sequentially cooperate in an arbitrary order.

Example of a Mobile Device

In the first embodiment, the smart phone 10 is used as an example of a mobile device; however, the embodiment is not limited thereto. In addition to a smart phone, examples of the mobile device include a mobile phone, a Wi-Fi equipped digital camera or video camera, and a digital camera or a video camera to which a Wi-Fi equipped memory card is inserted.

Software Configuration

Figure 9:
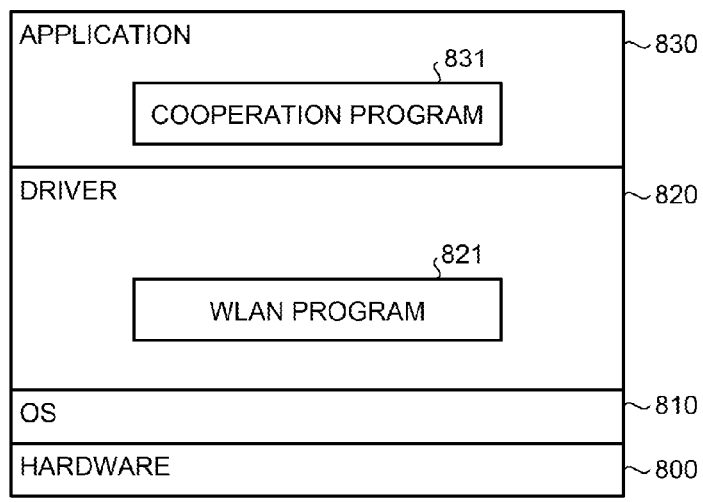
FIG. 9 is a schematic diagram illustrating the configuration of software.

In the following, the configuration of software that is used to implement cooperation between the PC 1 and the smart phone 10 will be described. FIG. 9 is a schematic diagram illustrating the configuration of software. As illustrated in FIG. 9, the software that is used to implement the cooperation between the PC 1 and the smart phone 10 includes an OS 810, a driver 820, and an application 830. The OS 810, the driver 820, and the application 830 implement a cooperation process by cooperating with hardware 800.

The driver 820 includes a WLAN program 821. The WLAN program 821 executed by the PC 1 implements the function of the WLAN unit 4 that is illustrated in FIG. 2. Furthermore, the WLAN program 821 executed by the smart phone 10 implements the function of the WLAN unit 14 that is illustrated in FIG. 2.

The application 830 includes a cooperation program 831. The cooperation program 831 executed by the PC 1 implements the same function as that performed by each processing unit included in the control unit 5 illustrated in FIG. 2. Furthermore, the cooperation program 831 executed by the smart phone 10 implements the same function as that performed by each processing unit included in the control unit 15 illustrated in FIG. 2. By using the WLAN program 821, the cooperation program 831 cooperates with another information communication device. Specifically, the cooperation program 831 executed by the PC 1 (or the smart phone 10) executes the cooperation process by cooperating with the cooperation program 831 that is executed by the smart phone 10 (or the PC 1).

Configuration of Hardware of the Smart Phone

Figure 10:
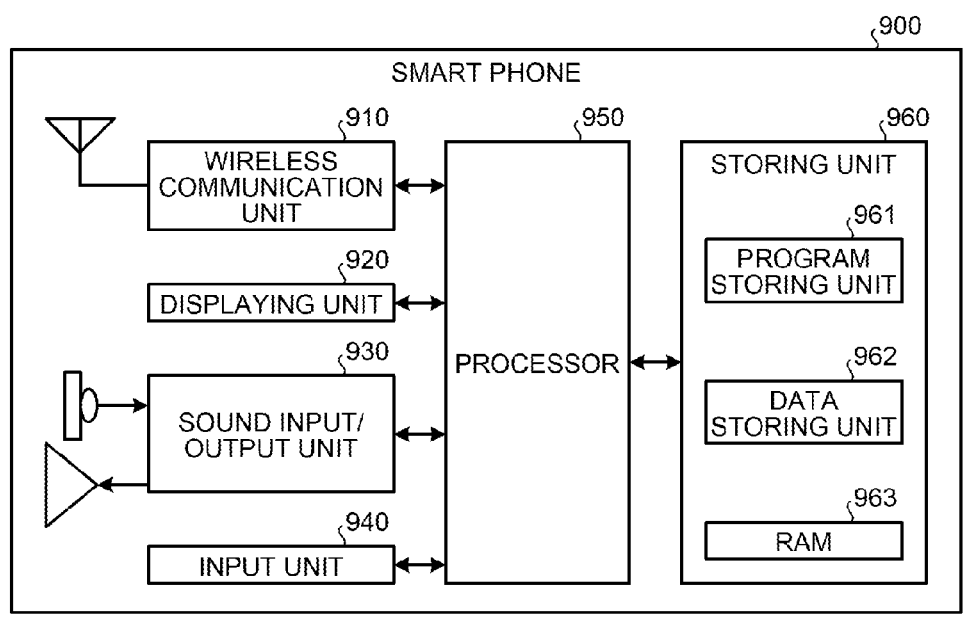
FIG. 10 is a schematic diagram illustrating the configuration of hardware of a smart phone.

FIG. 10 is a schematic diagram illustrating the configuration of the hardware of a smart phone. As illustrated in FIG. 10, a smart phone 900 includes a wireless communication unit 910, a displaying unit 920, a sound input/output unit 930, an input unit 940, a processor 950, and a storing unit 960. Each of the wireless communication unit 910, the displaying unit 920, the sound input/output unit 930, the input unit 940, and the storing unit 960 is connected to the processor 950.

The storing unit 960 includes a program storing unit 961, a data storing unit 962, and a random access memory (RAM) 963. The program storing unit 961 stores therein a program, such as the cooperation program 831, that implements the same function as that performed by each processing unit included in the control unit 15 illustrated in FIG. 2. The data storing unit 962 stores therein various pieces of data that are stored in each DB illustrated in FIG. 2. The storing unit 960 is a semiconductor memory device, such as a RAM and a flash memory, or a storage device, such as a hard disk drive (HDD) or an optical disk.

The processor 950 is an integrated circuit, such as an application specific integrated circuit (ASIC) or a field programmable gate array (FPGA), or an electronic circuit, such as a central processing unit (CPU) or a micro processing unit (MPU). The processor 950 reads the program, such as the cooperation program 831, from the storing unit 960 and loads the cooperation program 831 in the RAM 963. Consequently, the program, such as the cooperation program 831, functions as a process, such as a cooperation process. Then, the cooperation process appropriately loads, in an area of the RAM 963 allocated to the cooperation process, information or the like that is read from the data storing unit 962 and executes various kinds of data processing depending on the loaded data.

Hardware Configuration of a PC

Figure 11:
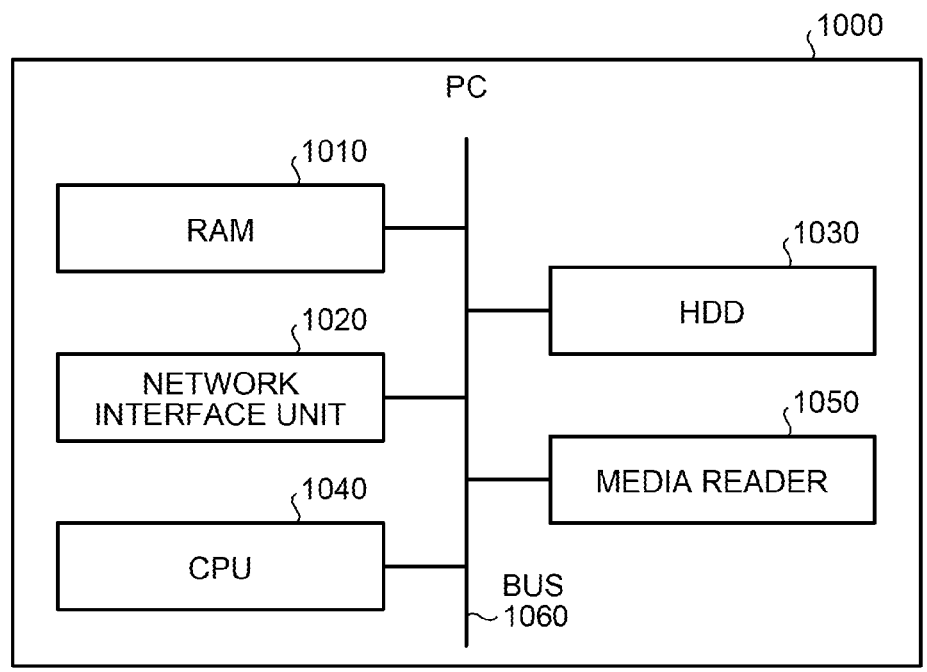
FIG. 11 is a schematic diagram illustrating the configuration of hardware of a PC.

FIG. 11 is a schematic diagram illustrating the configuration of the hardware of a PC. As illustrated in FIG. 11, a PC 1000 includes a RAM 1010, a network interface unit 1020, an HDD 1030, a CPU 1040, a media reader 1050, and a bus 1060. The RAM 1010, the network interface unit 1020, the HDD 1030, the CPU 1040, and the media reader 1050 are connected by the bus 1060.

The HDD 1030 stores therein a program, such as the cooperation program 831, that implements the same function as that performed by each processing unit that is included in the control unit 5 illustrated in FIG. 2. Furthermore, the HDD 1030 stores therein various pieces of data that are stored in each DB illustrated in FIG. 2.

Then, the CPU 1040 reads the cooperation program 831 from the HDD 1030 and loads the cooperation program 831 in the RAM 1010. Consequently, the cooperation program 831 functions as a cooperation process. Then, the cooperation process appropriately loads, in an area of the RAM 963 allocated to the cooperation process, information or the like that is read from the HDD 1030 and executes various pieces of data processing depending on the loaded data.

Even if a program, such as the cooperation program 831 is not stored in the HDD 1030, the media reader 1050 reads the program, such as the cooperation program 831, from a medium that stores therein the program. An example of the media reader 1050 includes a CD-ROM or an optical disk device.

The network interface unit 1020 is a device that is connected to an external device via a network and that is capable of wireless communication.

The cooperation program 831 described above may also be stored in another computer (or a server) that is connected to the PC 1000 via a public circuit, the Internet, a LAN, a wide area network (WAN), or the like. In such a case, the PC 1000 reads the cooperation program 831 from the other computer or the like via the network interface unit 1020.

System

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

According to an aspect of the wireless communication program, the mobile device, and the wireless communication system disclosed in the present invention, an advantage is provided in that electrical power consumption can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a wireless communication program causing a mobile device retaining content to execute a process comprising:

comparing, at predetermined interval that is determined according to an operating state of the mobile device, after the predetermined time has elapsed since an information processing apparatus targeted for the cooperation has acquired the content, a list of the content that is acquired by the information processing apparatus targeted for the cooperation before the predetermined time with a list of content retained after the predetermined time has elapsed, the content including at least one of a still image, a moving image, a sound or an application;

determining whether a difference is present in a comparison result at the comparing;

searching for, when the determining determines the difference is present, the information processing apparatus that is not connected to the mobile device in a normal operation and that is targeted for the cooperation, for establishing the wireless communication with the information processing apparatus in an communicate area via wireless communication, by booting up a wireless communication function to perform the wireless communication; and connecting to, by the wireless communication, the information processing apparatus that has been searched for and that is targeted for the cooperation, wherein the connecting includes maintaining the connection of the wireless communication for a predetermined time after the information processing apparatus targeted for the cooperation completes the acquisition of the content, the connecting includes causing the information processing apparatus targeted for the cooperation to acquire the content when the retained content has been updated within the predetermined time, and the connecting includes disconnecting the connection of the wireless communication when the retained content has not been updated within the predetermined time.

2. The non-transitory computer-readable recording medium according to claim 1, wherein the process further comprises:

notifying, for each type of the content, setting information indicating whether the content is to be acquired or not to be acquired, to the information processing apparatus that is connected to the mobile device by the wireless communication and that is targeted for the cooperation.

3. The non-transitory computer-readable recording medium according to claim 1, wherein, when the mobile device is not operated by a user, the searching includes searching for the information processing apparatus that is targeted for the cooperation, by booting up the wireless communication function.

4. The non-transitory computer-readable recording medium according to claim 1, wherein the operating state includes a remaining battery of the mobile device.

5. A mobile device retaining content comprising:

a memory; and a processor coupled to the memory, wherein the processor executes a process comprising:

comparing, at predetermined interval that is determined according to an operating state of the mobile device, after the predetermined time has elapsed since the information processing apparatus targeted for the cooperation has acquired the content, a list of the content that is acquired by the information processing apparatus targeted for the cooperation before the predetermined time with a list of content retained after the predetermined time has elapsed, the content including at least one of a still image, a moving image, a sound or an application;

determining whether a difference is present in a comparison result at the comparing;

searching for, when the determining determines the difference is present, the information processing apparatus that is not connected to the mobile device in a normal operation and that is targeted for the cooperation, for establishing the wireless communication with the information processing apparatus in an communicate area via wireless communication, by booting up a wireless communication function to perform the wireless communication; and connecting to, by the wireless communication, the information processing apparatus that has been searched for and that is targeted for the cooperation, wherein the connecting includes maintaining the connection of the wireless communication for a predetermined time after the information processing apparatus targeted for the cooperation completes the acquisition of the content, the connecting includes causing the information processing apparatus targeted for the cooperation to acquire the content when the retained content has been updated within the predetermined time, and the connecting includes disconnecting the connection of the wireless communication when the retained content has not been updated within the predetermined time.

6. A wireless communication system comprising:

a mobile device retaining content that includes a first memory and a first processor coupled to the first memory; and an information processing apparatus that includes a second memory and a second processor coupled to the second memory, wherein the first processor executes a first process including comparing, at predetermined interval that is determined according to an operating state of the mobile device, after the predetermined time has elapsed since the information processing apparatus targeted for the cooperation has acquired the content, a list of the content that is acquired by the information processing apparatus targeted for the cooperation before the predetermined time with a list of content retained after the predetermined time has elapsed, the content including at least one of a still image, a moving image, a sound or an application, determining whether a difference is present in a comparison result at the comparing, searching for, when the determining determines the difference is present, the information processing apparatus that is not connected to the mobile device in a normal operation and that is targeted for the cooperation, for establishing the wireless communication with the information processing apparatus in an communicate area via wireless communication, by booting up a wireless communication function to perform the wireless communication, and connecting to, by the wireless communication, the information processing apparatus that has been searched for and that is targeted for the cooperation, and the second processor executes a second process including retaining content acquired from the mobile device in the second memory, extracting, when the information processing apparatus is connected by the wireless communication, a difference between the content retained at the retaining and the content retained by the mobile device, and acquiring content that corresponds to the difference extracted at the extracting from the mobile device to be connected by the wireless communication and storing the acquired content to the second memory, wherein the connecting includes maintaining the connection of the wireless communication for a predetermined time after the information processing apparatus targeted for the cooperation completes the acquisition of the content, the connecting includes causing the information processing apparatus targeted for the cooperation to acquire the content when the retained content has been updated within the predetermined time, and the connecting includes disconnecting the connection of the wireless communication when the retained content has not been updated within the predetermined time.

7. The mobile device according to claim 5, wherein the operating state includes a remaining battery of the mobile device.

8. The wireless communication system according to claim 6, wherein the operating state includes a remaining battery of the mobile device.

* * * * *